(12) United States Patent
Ruoti

(10) Patent No.: US 11,003,815 B2
(45) Date of Patent: May 11, 2021

(54) DIMENSIONAL REDUCTION OF FINITE ELEMENT ANALYSIS SOLUTION FOR RAPID EMULATION

(71) Applicant: United Technologies Corporation, Farmington, CT (US)

(72) Inventor: Christopher A. Ruoti, Bloomfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 677 days.

(21) Appl. No.: 15/819,287

(22) Filed: Nov. 21, 2017

(65) Prior Publication Data

US 2019/0155976 A1 May 23, 2019

(51) Int. Cl.
| | |
|---|---|
| *G06F 17/10* | (2006.01) |
| *G06F 30/23* | (2020.01) |
| *G06F 111/20* | (2020.01) |
| *G06F 3/0484* | (2013.01) |
| *G06T 19/00* | (2011.01) |

(52) U.S. Cl.
CPC .......... *G06F 30/23* (2020.01); *G06F 3/04847* (2013.01); *G06F 2111/20* (2020.01); *G06T 19/00* (2013.01)

(58) Field of Classification Search
CPC ....................................................... G06F 30/23
USPC ............................................................ 703/1
See application file for complete search history.

(56) References Cited

U.S. PATENT DOCUMENTS

| | | | |
|---|---|---|---|
| 7,016,825 B1 * | 3/2006 | Tryon, III | .............. G06F 30/23 703/6 |
| 7,751,917 B2 | 7/2010 | Rees et al. | |
| 9,483,605 B2 | 11/2016 | Morris et al. | |
| 2010/0145662 A1 * | 6/2010 | Teng | ...................... G06F 30/23 703/1 |

OTHER PUBLICATIONS

Chung et al. (Adaptive multiscale model reduction with Generalized Multiscale Finite Element Methods, 34 pages (Year: 2016).*

(Continued)

*Primary Examiner* — Andre Pierre Louis
(74) *Attorney, Agent, or Firm* — Carlson, Gaskey & Olds, P.C.

(57) ABSTRACT

An example method of analyzing a structure includes generating initial simulation results for at least one finite element model, each of the at least one finite element models includes a plurality of nodes representing a structure. The initial simulation results simulate a response of the plurality of nodes to boundary conditions for a plurality of sets of input variable values. Each set of input variable values represents a different geometry of the structure or a different set of boundary conditions. The initial simulation results are decomposed into a plurality of patterns that indicate correlations between values in the initial simulation results. The plurality of patterns has a quantity that is less than the plurality of nodes. A respective emulator is created for each pattern. The initial simulation results are expanded by determining additional simulation results for the plurality of nodes using the emulators and additional sets of input variable values.

20 Claims, 6 Drawing Sheets

(56) References Cited

OTHER PUBLICATIONS

Bunnel, Spencer, et al. "Rapid Visualization of Compressor Blade Finite Element Models Using Surrogate Modeling," GT2018-77188, ASME Turbo Expo 2018, Jun. 11-15 2018, Oslo, Norway.
Heap, Ryan C. "Real-Time Visualization of Finite Element Models Using Surrogate Modeling Methods," Dept. of Mechanical Engineering, Brigham Young University, Aug. 2013.
Asher, M.J, et al. "A review of surrogate models and their application to groundwater modeling," AGU Publications, Water Resources Research, 2015. Review Article, 10.1002/2015WR016967. American Geophysical Union.
Yasong, Qiu and Junqiang, Bai. "Stationary flow fields prediction of variable physical domain based on proper orthogonal decomposition and kriging surrogate model," Chinese Society of Aeronautics and Astronautics & Beihang University, Chinese Journal of Aeronautics, 2015, 28(1): 44-56.
Ackermann, Sascha, et al. "Principal component analysis for detection of globally important input parameters in nonlinear finite element analysis," Dynardo, presented at the 5th Weimar Optimization and Stochastic Days 5.0—Nov. 20-21, 2008. Source: www.dynardo.de/en/library. Downloaded Sep. 1, 2015.

\* cited by examiner

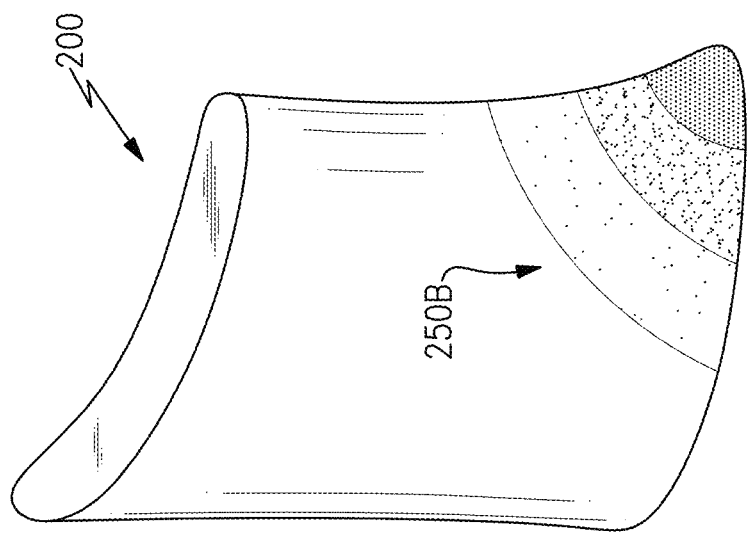
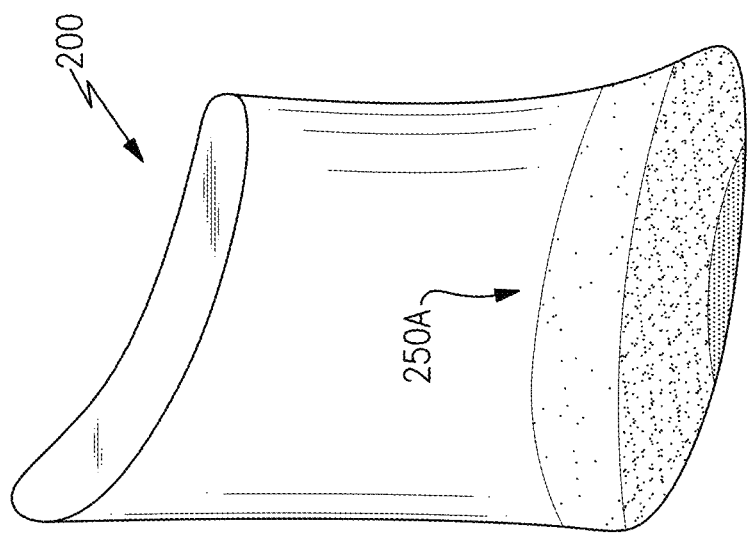

DIMENSIONAL REDUCTION OF FINITE ELEMENT ANALYSIS SOLUTION FOR RAPID EMULATION

BACKGROUND

The present disclosure relates to analyzing a structure, and more particularly to supplementing finite element analysis results for a structure with separate emulator results.

Finite Element Analysis (FEA) is a known technique for simulating a response of a structure to a set of boundary conditions. For example, FEA can be used to determine stress, vibration, fatigue, thermal expansion, and/or aerodynamic pressures, for example, of the structure when subjected to the boundary conditions. FEA utilizes a Finite Element Model (FEM) for a structure that typically includes many thousands of nodes and elements representing discreet locations on the structure. For example, it is not uncommon to have 50,000 to several 100,000 or more nodes in a FEM for a given structure, such as an airfoil. FEA separately determines the behavior of each respective node and element of the FEM in order to predict how the overall structure will respond to the boundary conditions.

A Design of Experiments (DOE) can be used to define one or more sets of input variables that are used to construct a FEM. Each set of input variable values represents a different geometry and/or set of boundary conditions for the structure. The FEA is performed on the FEM to obtain simulation results. In this fashion, many design iterations for a structure can be tested through a plurality of FEA "runs." Each run represents the performance of FEA for a given set of the input variable values to determine a set of FEA solutions. Given the high number of nodes typically present in a FEM, determining FEA results for a plurality of sets of input variable values is computationally intensive and time-consuming.

SUMMARY

A method of analyzing a structure according to an example of the present disclosure includes generating, using a computer processor, initial simulation results for at least one finite element model. Each of the at least one finite element models includes a plurality of nodes representing a structure, and the initial simulation results simulate a response of the plurality of nodes to boundary conditions for a plurality of sets of input variable values. Each set of input variable values represents a different geometry of the structure or a different set of boundary conditions. The initial simulation results are decomposed into a plurality of patterns that indicate correlations between values in the initial simulation results. The plurality of patterns has a quantity that is less than the plurality of nodes. A respective emulator is created for each of the plurality of patterns in a pattern set. The initial simulation results are expanded by determining additional simulation results for the plurality of nodes using the emulators and additional sets of input variable values that differ from the initial sets of input variable values.

A further embodiment of any of the foregoing embodiments, includes performing a dimensional reduction on the initial simulation results as part of the decomposing of the initial simulation results.

In a further embodiment of any of the foregoing embodiments, the dimensional reduction is performed based on nodal values for each of the plurality of nodes.

In a further embodiment of any of the foregoing embodiments, the dimensional reduction is performed based on elemental values.

In a further embodiment of any of the foregoing embodiments, the plurality of nodes or their corresponding elements form a first grid, an additional grid is interpolated onto the first grid, nodal or elemental values are determined for the additional grid, and the dimensional reduction is performed based on the nodal or elemental values for the additional grid.

In a further embodiment of any of the foregoing embodiments, the plurality of patterns are ranked based on how much they account for variation in the initial simulation results, and the plurality of patterns are filtered by excluding ones of the patterns from the pattern set that have a rank below a predefined threshold.

In a further embodiment of any of the foregoing embodiments, the quantity of patterns in the pattern set is 50-5,000 times lower than the quantity of nodes.

In a further embodiment of any of the foregoing embodiments, the determination of additional simulation results includes, for each of the additional sets of input variable values: inputting the input variable values from the additional set into the respective emulators for each of the plurality of patterns in the pattern set to obtain emulator results, and performing an inverse transformation on the emulator results to obtain nodal, elemental, or grid point values for the additional set.

In a further embodiment of any of the foregoing embodiments, an image of the structure is displayed on an electronic display along with an indication of the simulation results corresponding to a selected set of input variable values for the structure, and the indication of simulation results identifies a plurality of areas exhibiting the response to the boundary conditions.

In a further embodiment of any of the foregoing embodiments, an image of the structure is displayed on an electronic display along with an indication of the simulation results corresponding to a selected set of input variable values for the structure and a user interface element, and the additional simulation results for a given one of the additional sets of input variable values are dynamically determined and displayed based on selection of the given set of input variable values with the user interface element.

In a further embodiment of any of the foregoing embodiments, the additional simulation results for a given one of the additional sets of input variable values are verified by inputting the values of the given one of the additional sets into the finite element model.

A computing device for analyzing a structure according to an example of the present disclosure includes memory storing at least one finite element model, each of the at least one finite element models including a plurality of nodes representing a structure, and a processor operatively connected to the memory and configured to generate initial simulation results for the at least one finite element model. The initial simulation results simulate a response of the plurality of nodes to boundary conditions for a plurality of sets of input variable values. Each set of input variable values represents a different geometry of the structure or a different set of boundary conditions. The processor is configured to decompose the initial simulation results into a plurality of patterns wherein the plurality of patterns indicate correlations between values in the initial simulation results, and the plurality of patterns has a quantity that is less than the plurality of nodes. The processor is configured to create a respective emulator for each of the plurality of patterns in a pattern set, and expand the initial simulation results by determining additional simulation results for the plurality of nodes using the emulators and additional sets of input variable values that differ from the initial sets of input variable values.

A further embodiment of any of the foregoing embodiments, the processor is configured to perform a dimensional reduction on the initial simulation results as part of decomposing the initial simulation results.

In a further embodiment of any of the foregoing embodiments, the dimensional reduction is performed based on nodal values for each of the plurality of nodes.

In a further embodiment of any of the foregoing embodiments, the dimensional reduction is performed based on elemental values.

In a further embodiment of any of the foregoing embodiments, the plurality of nodes or their corresponding elements form a first grid, and the processor is configured to interpolate an additional grid onto the first grid, and determine nodal or elemental values for the additional grid, wherein the dimensional reduction is performed based on the nodal or elemental values for the additional grid.

In a further embodiment of any of the foregoing embodiments, the processor is configured to rank the plurality of patterns based on how much they account for variation in the initial simulation results, and filter the plurality of patterns by excluding ones of the patterns from the pattern set that have a rank below a predefined threshold.

In a further embodiment of any of the foregoing embodiments, the quantity of patterns in the pattern set is 50-5,000 times lower than the quantity of nodes.

In a further embodiment of any of the foregoing embodiments, to determine additional simulation results for the plurality of nodes, the processor is configured to, for each of the additional sets of input variable values, input the input variable values from the additional set into the respective emulators for each of the plurality of patterns in the pattern set to obtain emulator results, and perform an inverse transformation on the emulator results to obtain nodal, elemental, or grid point values for the additional set.

In a further embodiment of any of the foregoing embodiments, the processor is configured to display an image of the structure on an electronic display along with an indication of the simulation results corresponding to a selected set of input variable values for the structure. The indication of simulation results identifies a plurality of areas exhibiting the response to the boundary conditions.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIGS. 4A-B schematically illustrate example patterns, according to an embodiment.

DETAILED DESCRIPTION

Figure 1:
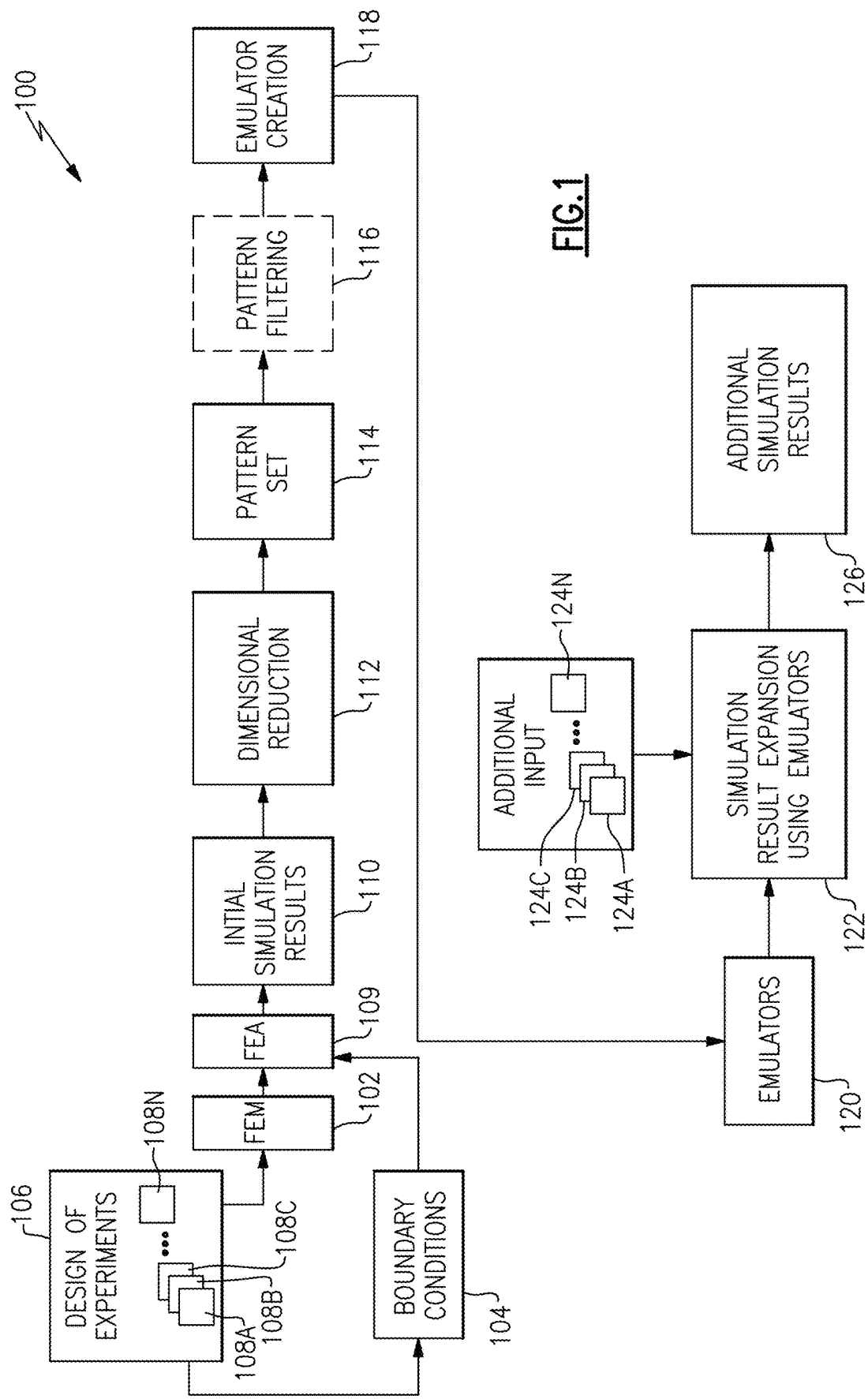
FIG. 1 schematically illustrates an example method of analyzing a structure, according to an embodiment.

FIG. 1 schematically illustrates an example method 100 of analyzing a structure. For the discussion below, the example structure of an airfoil for a gas turbine engine will be discussed. It is understood, however, that the same method could be used to analyze many different structures, including those that are not part of a gas turbine engine.

A Finite Element Model (FEM) 102 includes a plurality of nodes and elements representing a structure of the airfoil. In some examples, the FEM 102 includes at least 50,000 nodes. In a further example, the FEM 102 includes one or several hundred thousand nodes. The collection of nodes and elements collectively forms a mesh.

Figure 2:
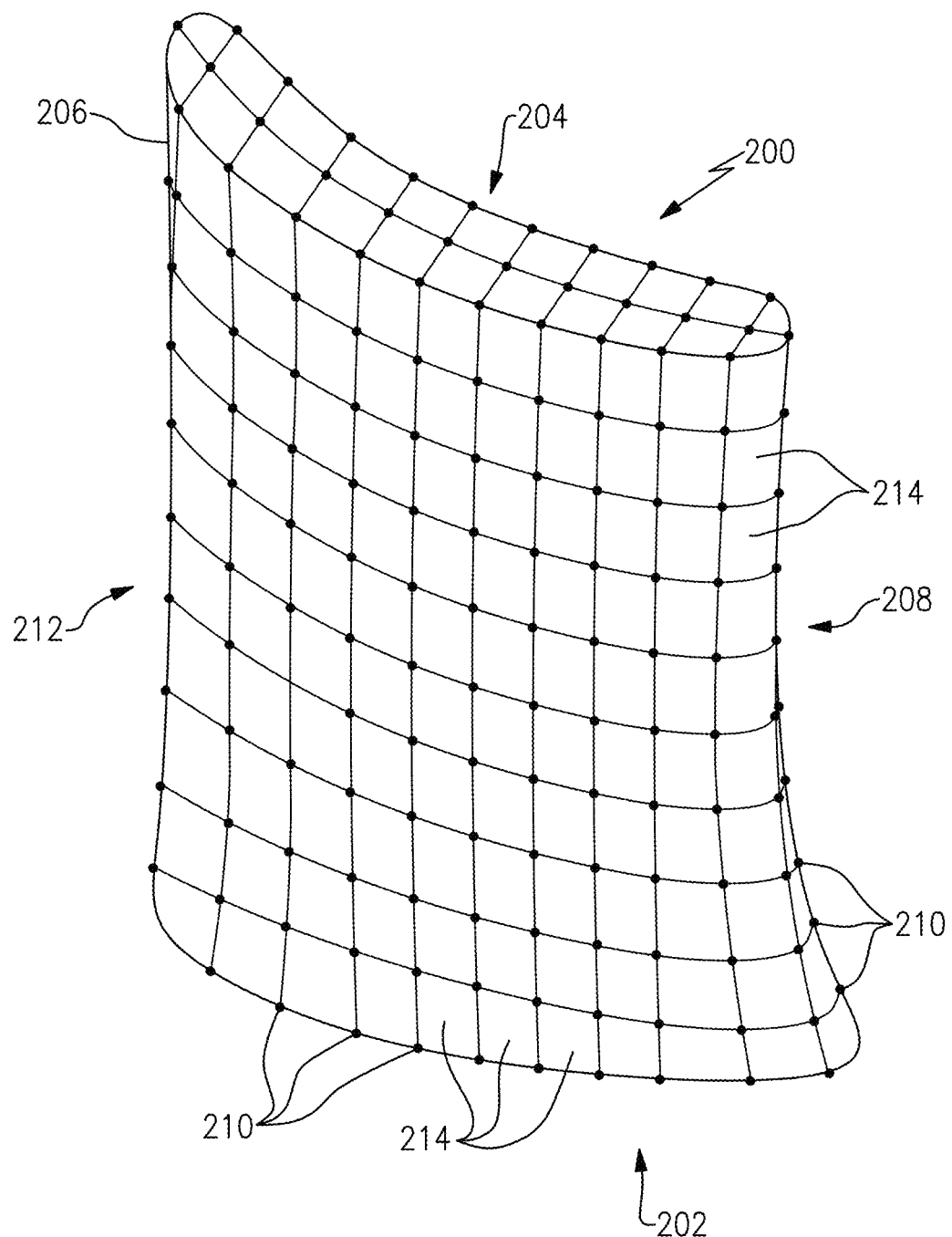
FIG. 2 schematically illustrates an example mesh for a structure, according to an embodiment.

FIG. 2 illustrates an example airfoil 200 having a root 202, tip 204, leading edge 206, and trailing edge 208. The airfoil includes plurality of nodes 210 that represent its structure, collectively form a mesh 212, and are part of a FEM. Each dot in FIG. 2 is a node 210, and each four-sided shape connecting the nodes 210 is a finite element 214. Although the finite elements 214 depicted in FIG. 2 are four-sided, it is understood that other quantities of sides could be used (e.g., three-sided). Also, it is understood that many more nodes could be included in the FEM 102 than are shown in FIG. 2 (e.g., many thousands).

An FEA solution produces a result at every node and element, known as "nodal values" and "element values" respectively.

Although FIG. 2 depicts a particular example, reference numbers 210, 212, and 214 will be used generically herein to refer to nodes, a mesh, and a finite element, respectively, without being limited to the particular example of FIG. 2.

Returning now to FIG. 1, boundary conditions 104 are shown that define a number of different load cases for application to the FEM 102. Some example boundary conditions 104 could include an engine speed of the gas turbine engine, material properties, a location at which the airfoil is mounted within the gas turbine engine, etc.

A design of experiments (DOE) 106 provides a plurality of sets 108A-N of input variable values, where each set 108 of inputs is also input into the FEM 102 and/or boundary conditions 104. The DOE 106 is used to define the inputs for each FEA run. The inputs can include geometric definition, boundary conditions, and/or algorithm options, for example. The inputs may be actual values for use, or relative offsets from a baseline. In some examples, there are steps between the inputs defined by the DOE 106 and having the FEM 102 or boundary conditions 104 for the FEA 109. For example, the FEM 102 may be created using code that takes some inputs and creates the mesh. In another example, there may be a parametric CAD model that when given updated inputs, updates a part geometry and then meshes the part.

In the example of FIG. 1, the DOE 106 includes a plurality of sets 108A-N of input variable values. The sets 108 provide different values for a plurality of input variables. Some example input variables for an airfoil could include a leading edge radius, a trailing edge radius, a thickness at an airfoil root, a thickness at an airfoil tip, a thickness at a midspan of an airfoil, a thickness over a chord of an airfoil, a maximum thickness, a location of a maximum thickness, etc. Other examples of some input variables for an airfoil affecting boundary conditions could include rotational speed, displacement at the root, and temperatures.

Each set of input variable values represents a different geometry and/or set of boundary conditions of the airfoil. An algorithm such as latin-hypercube, box-benhken, full-factorial, or the like may be used in determining the DOE 106, for example.

FEA is performed (block 109) using the FEM 102 and boundary conditions 104 defined by each of the plurality of sets 108A-N to obtain initial simulation results 110. One "run" is performed for each set of input variable values 108A, B, C . . . N. The initial simulation results 110 simulate a response of the plurality of nodes and elements to the boundary conditions 104 for the sets 108 of input variable values.

Although a single FEM 102 and boundary condition 104 are shown in FIG. 1, it is understood that multiple FEMs 102 and boundary conditions 104 could be formed from a single DOE 106. In one example, each set of input variables from the DOE 106 will define a different FEM 102 but will not change the boundary conditions 104. In another example, each set of input variables from the DOE 106 will define a different set of boundary conditions 104 but will not change the FEM 102. In another example, each set of input variables from the DOE 106 will update both the FEM 102 and boundary conditions 104. In another example, some set of input variables vary boundary conditions 104 while the same or other sets of input variables vary different FEMs 102. Thus, although a single FEM 102 and set of boundary conditions 104 are shown in FIG. 1, that is a non-limiting example.

The initial simulation results 110 are decomposed into a plurality of patterns using a dimensional reduction technique (block 112). Some example dimensional reduction techniques include principal component analysis (PCA), kernel PCA, linear discriminate analysis, etc. The dimensional reduction reduces the initial simulation results 110 to a plurality of patterns that indicate correlations between values in the initial simulation results 110. In the example of principal component analysis, each pattern has a magnitude that indicates the extent to which the pattern appears in a given FEA run. The patterns are arranged into a pattern set 114.

A pattern for the airfoil 200 could represent one of the following, for example: stress decreasing from the root 202 of the airfoil to the tip 204 of the airfoil as one moves radially outward; and stress reducing as one moves from on a path from the airfoil root 202 at the trailing edge 208 to the airfoil tip 204 at the leading edge 206. These are non-limiting examples, and it is understood that many other patterns could be considered and are within the contemplation of this disclosure.

The quantity of patterns is less than the quantity of nodes. In one example, the quantity of patterns in the pattern set 114 is 100-2,000 times lower than the quantity of nodes (e.g., one hundred patterns for an FEM having 10,000 to 200,000 nodes). In a further example, the quantity of patterns in the pattern set 114 is 500-2,000 times lower than the quantity of nodes in a given one of the at least one FEMs 102 (e.g., one hundred patterns for an FEM having 50,000 to 200,000 nodes). In a further example, the quantity of patterns in the pattern set 114 is 50-5,000 times lower than the quantity of nodes. The reduction depends on the size of the one or more FEM 102 and the number of patterns in the pattern set 114 (optionally after filtering 116).

In some instances, such as when principal component analysis is used, the number of patterns can be the same as the number of FEA runs performed.

Each pattern has an explained variance value which indicates how strongly the pattern contributes to the total variance of the initial simulation results 110. For example, it is possible for a pattern set of 100 patterns that 5 of the patterns account for 95% of the variation among the initial simulation results 110, and 95 of the patterns account for 5% of the variation among the initial simulation results 110. This would be reflected in the explained variance value of the patterns.

The dimensional reduction of block 112 can be performed on a full FEA result set (e.g., one result per node 210 or element 214), on some subset of the FEA result set, or an interpolated set of solutions based on the nodal or element values, for example. In one example, the subset of the FEA result set includes a specific grouping of the most relevant nodes (e.g., nodes near an expected high stress area).

The interpolated set in some examples is a "grid on grid" approach in which the interpolated set is a consistent grid that is fitted onto the grid of the mesh 212. In another example, the interpolated set may be a non-uniform grid. In another example, the interpolated set may be at a set arbitrary locations rather than a grid. The interpolation method may be but is not limited to, linear interpolation, quadratic interpolation, or nearest point. The interpolated grid approach can be useful if the mesh 212 is not made of consistent nodes across the plurality of FEA runs (e.g., if the nodes 210 shift positions beyond a predefined threshold between FEA runs).

Optionally, the pattern set 114 may be filtered (block 116) based on the relevance (e.g., explained variance) of the patterns. In one particular example, the patterns are ranked based on how much they account for variation in the initial simulation results 110, and the patterns are filtered by excluding ones of the patterns from the pattern set 114 that have a rank below a predefined threshold.

The threshold could be defined in different ways, such as having a cutoff that removes the N least influential patterns. In another example, the threshold could be defined so that a given pattern has to account for at least N % of the variation between the simulation results 110.

Figure 3B:
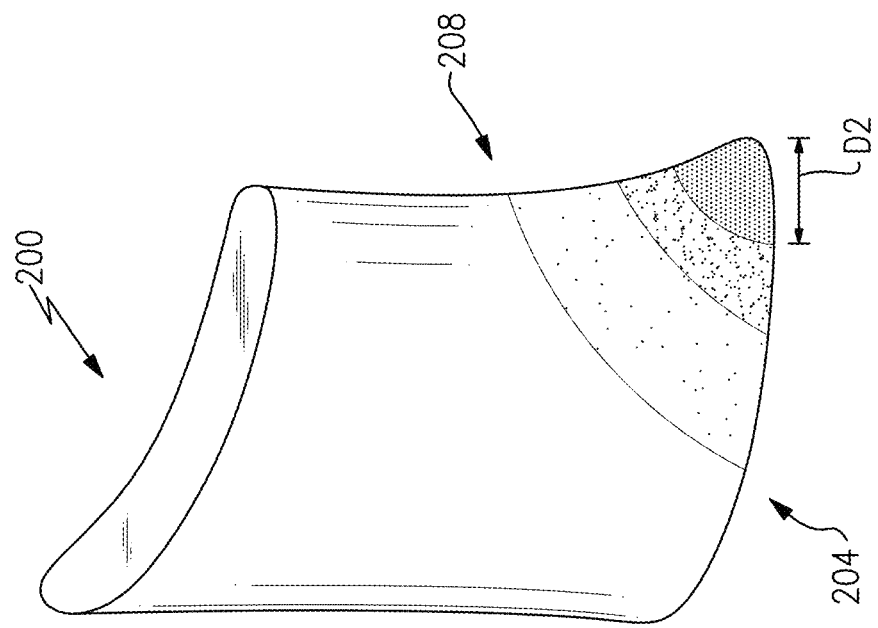
FIGS. 3A-B schematically illustrate example initial simulation results, according to an embodiment.
Figure 3A:
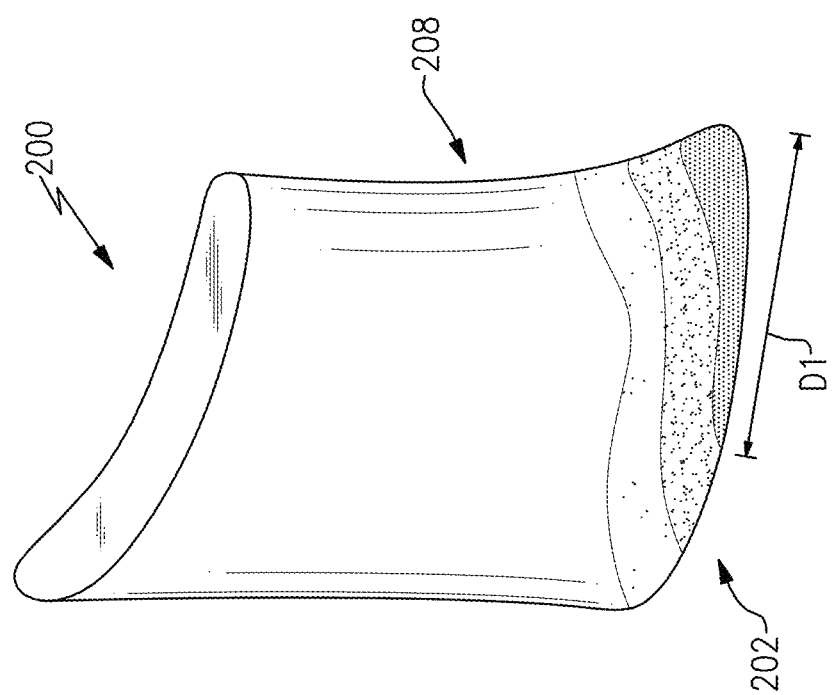

FIGS. 3A-B schematically illustrate example initial simulation results for stress of the structure 200 in a first FEA run (FIG. 3A) and a second FEA run (FIG. 3B). The contours represent the stresses of the nodal solutions, with increasing stress levels being depicted with darkened shading levels. In the example of FIG. 3A, the first FEA run indicates that highest stress levels are found at the junction of the root 202 and trailing edge 208, and also extend along a distance of approximately D1 along the root 202. In the example of FIG. 3B, the second FEA run indicates that highest stress levels are more concentrated at the junction of the root 202 and trailing edge 208, and only extend back along a distance of approximately D2 along the root 202, which is less than D1.

FIGS. 4A-B schematically illustrate example patterns 250A-B. The pattern 250A of FIG. 4A is clearly reflected in the FEA run of FIG. 3A, but is less noticeable in the FEA run of FIG. 3B. Thus, the pattern 250A has a stronger magnitude in the FEA run of FIG. 3A than in the FEA run of FIG. 3B. The pattern 250B of FIG. 4B is clearly shown in the FEA runs of both of FIGS. 3A-B. Thus, the pattern 250B has a relatively high magnitude in both of the depicted FEA runs in FIGS. 3A-B. The dimensional reduction of block 112 identifies patterns such as these and provides them in the pattern set 114. As used herein, a "magnitude" of a pattern is indicative of the extent to which the pattern appears in a given FEA run. A given pattern may have a low magnitude for certain FEA runs, and a high magnitude for other FEA runs.

Referring again to FIG. 1, a respective emulator, also known as a surrogate model, is created (block 118) for each of the plurality of patterns in the pattern set 114, to obtain a set of emulators 120. An emulator is a mathematical model that correlates the set of input values to the set of output values, which in this case are the magnitudes of the plurality of patterns. Each emulator is able to compute an output based on any given set of input values supplied to it. Examples of emulation algorithms include but are not limited to response surface modeling, kriging, support vector machines, neural networks, and radial basis functions. Instead of creating an emulator for every node 210 of the FEM 102, in one example an emulator is created for each pattern obtained from the dimensional reduction of block 112, such that there is a one-to-one relationship between emulator quantity and pattern quantity. In one example, if pattern filtering is performed in block 116, the pattern quantity is based on the filtered pattern set instead of the unfiltered pattern set 114.

Although a plurality of emulators are discussed herein, each corresponding to a respective pattern, it is understood that in some examples the emulators may be grouped together for storage or presentation in a given software emulation package which gives the appearance of a single emulator, or small group of emulators.

The initial simulation results 110 are expanded (block 122) using additional sets 124A-N of input variable values that differ from the initial sets 108A-N of input variable values, to obtain additional simulation results 126 that expand the initial simulation results 110 without requiring additional performance of FEA. Although the initial sets 108 and additional sets 124 both range from A-N, the Nth values for each set may be different (e.g., 100 initial sets 108, and 50 additional sets 124).

For each of the additional sets 124 of input variable values, the input variable values are input into the respective emulators for each of the plurality of patterns to obtain emulator results, which are a set of pattern magnitudes, and an inverse transformation is performed on the emulator results to that expands the dimensionality back to the original set (e.g., original nodal values, elemental values, or grid point values) for the nodes in the additional set 124.

In a typical FEA, complex algorithms are performed on the nodes and elements, resulting in a long and complex analysis requiring either a long run time and/or expensive computer equipment to execute.

If one were to create an emulator for every single nodal solution to determine additional simulation results, that could be somewhat less computationally complex than using full FEA runs in that that it would use a single calculation for each node based on the inputs, but could still be relatively time consuming. As an example, if one was working with a 50,000 node model, then one would compute 50,000 functions, one for each nodal solution.

The techniques proposed herein provides a greater reduction in computational complexity than using one emulator per node by utilizing the dimensional reduction of block 112, and instead emulating a reduced dimensional set. In this case, according to an embodiment, if 500 patterns have been identified, then 500 functions will be called and a single inverse calculation can be used to transform the results back to the full nodal set. In this example, the new method is approximately 100 times faster than creating an emulator for each node of a 50,000 node model. If the model is a 500,000 node model, then the new method may be approximately 1,000 times faster. The length of time needed to find additional simulation results depends on the number of nodes in the FEM 102, the boundary conditions 104, and the solution to be solved.

The method 100 correlates the initial simulation results 110 with each other using the dimensional reduction and pattern set creation, and emulation is then performed on the correlations of the outputs rather than on the outputs themselves. In the example of principal component analysis dimensional reduction, the magnitude of the detected patterns is emulated by the emulator mathematical models.

The input variable values in the additional sets 124 could be chosen so that the values are within the input variable values in the initial sets 108, or could be outside the input variable values in the initial sets 108, for example.

Figure 5:
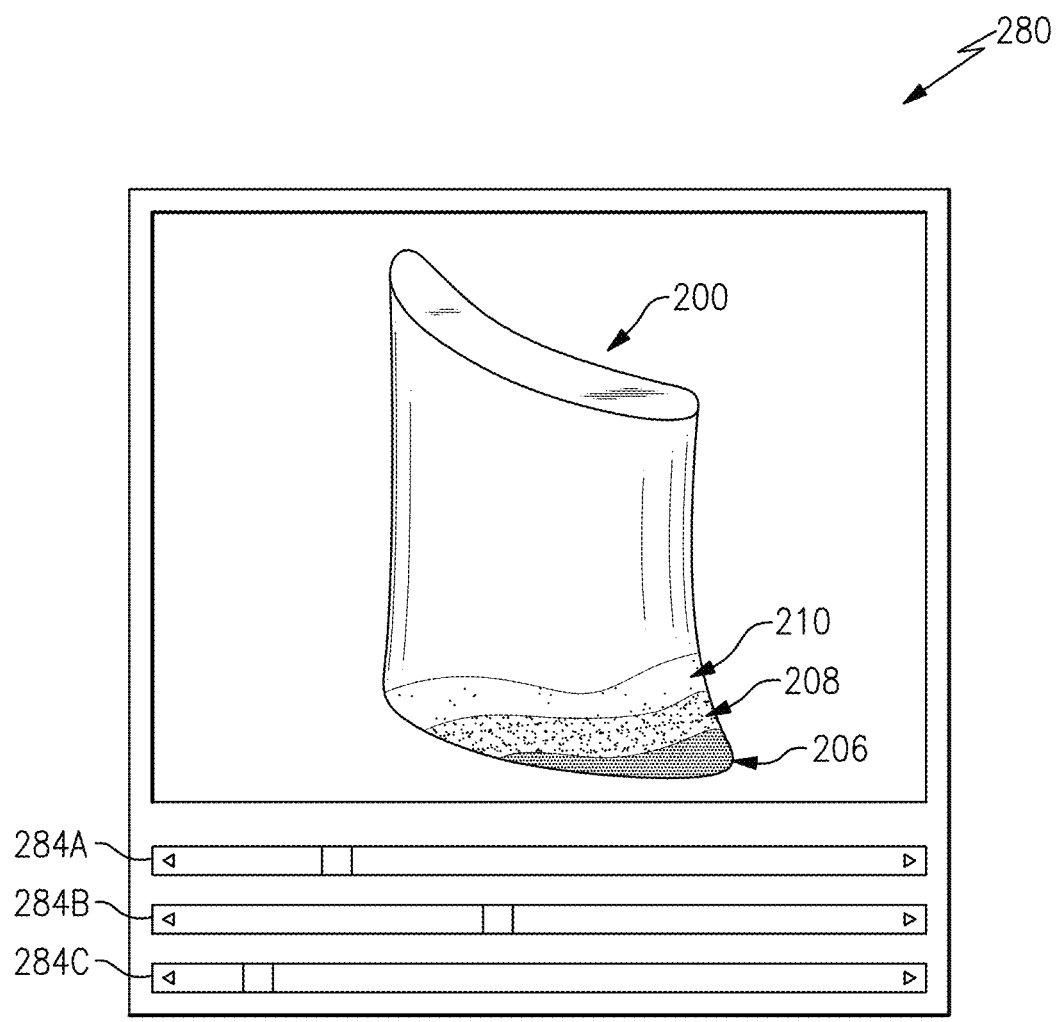
FIG. 5 illustrates an example user interface for displaying simulation results, according to an embodiment.

FIG. 5 illustrates an example user interface 280 for displaying simulation results. The user interface 280 includes an image of the structure 200 from FIG. 3A, along with an indication of the simulation results corresponding to a selected set of input variable values for the structure (as shown in FIG. 3A). In one example, the image is a three dimensional representation of the structure that can be panned, rotated, and zoomed in and out of. In another example, the image of the structure is a two dimensional image.

In one example, the displayed simulation results include a full nodal result set for the structure, including areas 206, 208, 210 that exhibit a certain response (e.g., stress) to the boundary conditions. Area 206 experiences a greater response than area 208, which experiences a greater response than area 210. In the example of FIG. 2, the structure 200 is rotor blade, but other structures could be used.

In another example, the displayed image could be a view of a pattern contribution on the run defined by the inputs. In another example, the image displayed could be a set of pattern contributions (e.g. a separate image each displaying a different pattern's contribution).

The user interface 280 also includes a plurality of user interface elements 284A-C, which in the example of FIG. 2 are sliders. The sliders 284 can be used to toggle through the sets 108, 124 of input variables for selecting a set of input variable values whose simulation results should be displayed. In another example, the user interface elements might be a collection of text fields where input values could be typed. In another example, the user interface elements could include a dropdown from which to select a run from the DOE 106.

In some examples, the additional sets 124 of input variable values are not part of the DOE 106, and the simulation results for the additional sets 124 of input variable values are not all determined at once. Rather, in one example, the simulation results for a given one of the additional sets 124 of input variable values are only computed upon selection of that set 124 by one of the user interface elements 284.

Because it is less computationally complex to determine the additional simulation results for a given additional set 124 of input variable values using the emulators 120, a computing device can update the three dimensional image 202 of the structure, including the indicated areas experiencing the response, very quickly, such that a user could quickly scroll through the geometries corresponding to the additional sets 124 of input variable values without a noticeable lag—something that would not be possible if a full FEA run had to be performed for each additional set 124.

When moving sliders and getting a new result set, it would take minutes, hours, or days to get results back from FEA. If using an individual emulator for every node there may be performance improvement, but response time in some examples could still be unacceptable to some users (e.g., over a second to generate new results based on dynamically determining additional simulation results using the emulators). If using emulators based on the dimensional reduction of block 112, results could be dynamically determined much quicker, and in some examples on the order 50-5,000 times quicker than the one emulator per node approach.

If one of the additional sets 124 of input variable values are selected as a desired design, the additional results corresponding to the selected set 124 may be input into the FEM 102 for a full FEA run to verify that the results simulated by the emulators are sufficiently accurate.

Figure 6:
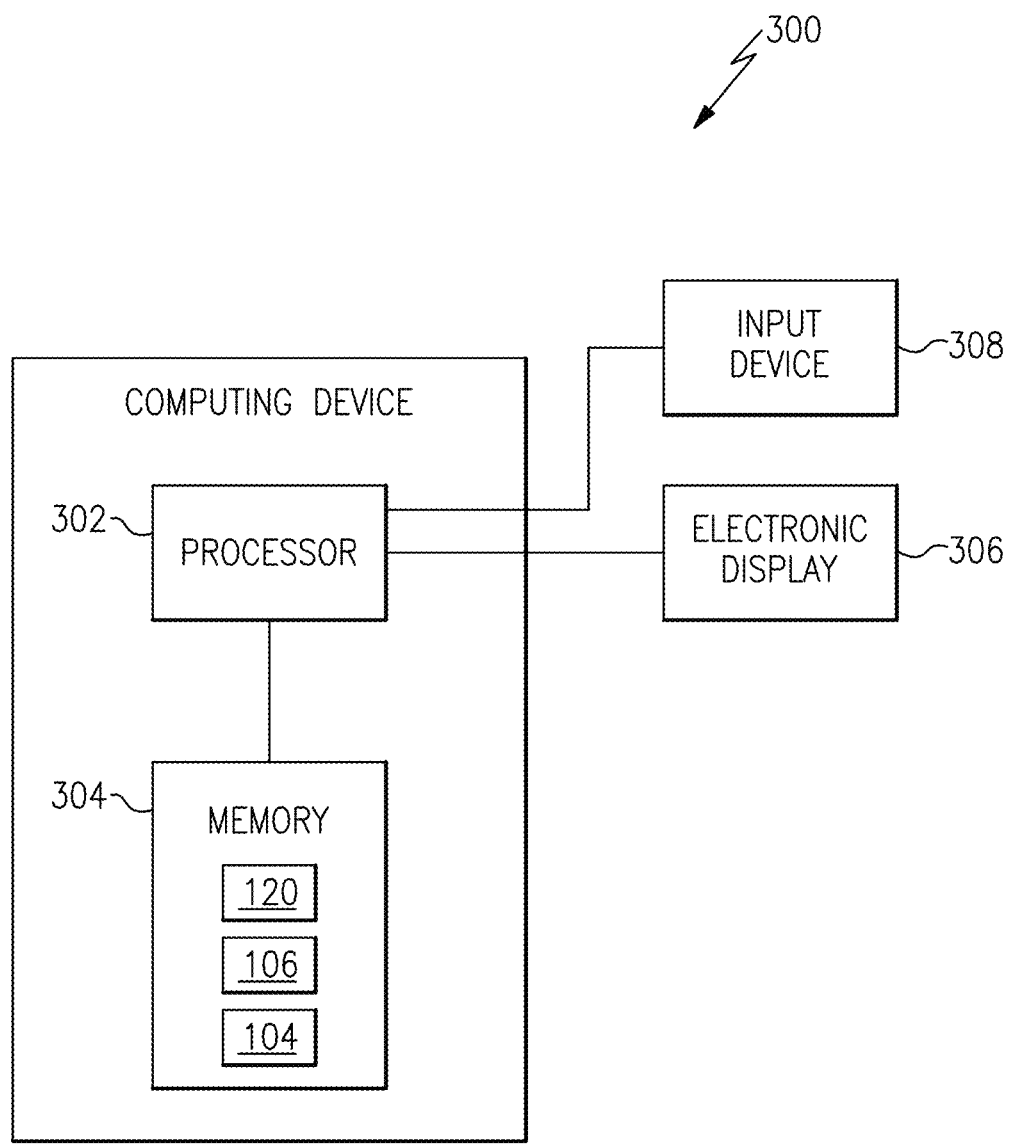
FIG. 6 schematically illustrates an example computing device operable to perform the method of FIG. 1, according to an embodiment.

FIG. 6 schematically illustrates an example computing device 300 operable to perform the method 100 of FIG. 1 and/or to provide the user interface 280 of FIG. 5. The computing device 300 includes a processor 302 and memory 304. The processor 302 may include one or more microprocessors, microcontrollers, application specific integrated circuits (ASICs), or the like, for example. The memory 304 stores the FEM 102, boundary conditions 104, and the design of experiments 106. The memory 304 also stores program instructions that, when executed by the processor 302, configure the processor to perform the method 100 and/or provide the user interface 280 on an electronic display 306. The processor 302 is also responsive to input from an input device 308, such as a mouse, trackpad, touchscreen, stylus, etc.

The techniques discussed herein dramatically decrease the time to obtain simulation results for a plurality of sets of input variable values. By using FEA to obtain the initial simulation results 110, using dimensional reduction techniques to determine patterns among those initial simulation results, and then using non-FEA emulators 120 to obtain the additional simulation results, results can be obtained much more quickly and efficiently than would be possible if full FEA runs were performed to obtain the additional simulation results.

Also, although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of analyzing a structure, comprising:
generating initial simulation results for at least one finite element model, each of the at least one finite element models including a plurality of nodes representing an airfoil of a gas turbine engine, and the initial simulation results simulating a response of the plurality of nodes to boundary conditions for a plurality of sets of input variable values, each set of input variable values representing a different geometry of the airfoil or a different set of boundary conditions;
decomposing the initial simulation results into a plurality of patterns wherein the plurality of patterns indicate correlations between values in the initial simulation results, and the plurality of patterns has a quantity that is less than the plurality of nodes;
creating a respective emulator for each of the plurality of patterns in a pattern set, wherein each emulator correlates one of the sets of input variable values that corresponds to the pattern to a magnitude of the pattern;
expanding the initial simulation results by determining additional simulation results for the plurality of nodes using the emulators and additional sets of input variable values that differ from the initial sets of input variable values, wherein the generating, decomposing, creating, and expanding steps are performed by a computer processor;
receiving a selection of a particular one of the additional sets of input variable values from a user; and
displaying an indication of the simulation results corresponding to the selection.

2. The method of claim 1, wherein said decomposing the initial simulation results comprises performing a dimensional reduction on the initial simulation results.

3. The method of claim 2, wherein the dimensional reduction is performed based on nodal values for each of the plurality of nodes.

4. The method of claim 3, wherein the dimensional reduction is performed based on elemental values.

5. The method of claim 2, wherein the plurality of nodes or their corresponding elements form a first grid, the method comprising:
interpolating an additional grid onto the first grid; and
determining nodal or elemental values for the additional grid;
wherein the dimensional reduction is performed based on the nodal or elemental values for the additional grid.

6. The method of claim 1, comprising:
ranking the plurality of patterns based on how much they account for variation in the initial simulation results; and
filtering the plurality of patterns by excluding ones of the patterns from the pattern set that have a rank below a predefined threshold.

7. The method of claim 1, wherein the quantity of patterns in the pattern set is 50-5,000 times lower than the quantity of nodes.

8. The method of claim 1, wherein said determining additional simulation results for the plurality of nodes comprises, for each of the additional sets of input variable values:
inputting the input variable values from the additional set into the respective emulators for each of the plurality of patterns in the pattern set to obtain emulator results; and
performing an inverse transformation on the emulator results to obtain nodal, elemental, or grid point values for the additional set.

9. The method of claim 1,
wherein the indication of simulation results identifies a plurality of areas exhibiting the response to the boundary conditions.

10. The method of claim 1, comprising:
displaying a user interface element;
wherein the selection of the particular one of the additional sets of input variable values is received from the user interface element; and
wherein the additional simulation results for a given one of the additional sets of input variable values are dynamically determined and displayed based on the selection.

11. The method of claim 1, comprising:
verifying the additional simulation results for a given one of the additional sets of input variable values by inputting the values of the given one of the additional sets into the finite element model.

12. A computing device for analyzing a structure, comprising:

memory storing at least one finite element model, each of the at least one finite element models including a plurality of nodes representing an airfoil of a gas turbine engine; and a processor operatively connected to the memory and configured to:

generate initial simulation results for the at least one finite element model, the initial simulation results simulating a response of the plurality of nodes to boundary conditions for a plurality of sets of input variable values, each set of input variable values representing a different geometry of the airfoil or a different set of boundary conditions;

decompose the initial simulation results into a plurality of patterns wherein the plurality of patterns indicate correlations between values in the initial simulation results, and the plurality of patterns has a quantity that is less than the plurality of nodes;

create a respective emulator for each of the plurality of patterns in a pattern set wherein each emulator correlates one of the sets of input variable values that corresponds to the pattern to a magnitude of the pattern;

expand the initial simulation results by determining additional simulation results for the plurality of nodes using the emulators and additional sets of input variable values that differ from the initial sets of input variable values;

receive a selection of a particular one of the additional sets of input variable values from a user; and display an indication of the simulation results corresponding to the selection.

13. The computing device of claim 12, wherein to decompose the initial simulation results, the processor is configured to perform a dimensional reduction on the initial simulation results.

14. The computing device of claim 13, wherein the dimensional reduction is performed based on nodal values for each of the plurality of nodes.

15. The computing device of claim 14, wherein the dimensional reduction is performed based on elemental values.

16. The computing device of claim 13, wherein the plurality of nodes or their corresponding elements form a first grid, and the processor is configured to:

interpolate an additional grid onto the first grid; and determine nodal or elemental values for the additional grid;

wherein the dimensional reduction is performed based on the nodal or elemental values for the additional grid.

17. The computing device of claim 12, wherein the processor is configured to:

rank the plurality of patterns based on how much they account for variation in the initial simulation results; and filter the plurality of patterns by excluding ones of the patterns from the pattern set that have a rank below a predefined threshold.

18. The computing device of claim 12, wherein the quantity of patterns in the pattern set is 50-5,000 times lower than the quantity of nodes.

19. The computing device of claim 12, wherein to determine additional simulation results for the plurality of nodes, the processor is configured to, for each of the additional sets of input variable values:

input the input variable values from the additional set into the respective emulators for each of the plurality of patterns in the pattern set to obtain emulator results; and perform an inverse transformation on the emulator results to obtain nodal, elemental, or grid point values for the additional set.

20. The computing device of claim 12, wherein the indication of simulation results identifies a plurality of areas exhibiting the response to the boundary conditions.

* * * * *